United States Patent
Sliwa et al.

(10) Patent No.: US 10,789,082 B2
(45) Date of Patent: Sep. 29, 2020

(54) EXECUTION OF MULTIPLE OPERATING SYSTEMS WITHOUT REBOOTING

(71) Applicants: Robert J Sliwa, Malvern, PA (US); Brittney Burchett, Malvern, PA (US); Michael J DiDomenico, Malvern, PA (US); Bryan E Thompson, Malvern, PA (US)

(72) Inventors: Robert J Sliwa, Malvern, PA (US); Brittney Burchett, Malvern, PA (US); Michael J DiDomenico, Malvern, PA (US); Bryan E Thompson, Malvern, PA (US)

(73) Assignee: Unisys Corporation, Blue Bell, PA (US)

(*) Notice: Subject to any disclaimer, the term of this patent is extended or adjusted under 35 U.S.C. 154(b) by 234 days.

(21) Appl. No.: 14/574,917

(22) Filed: Dec. 18, 2014

(65) Prior Publication Data
US 2016/0179553 A1    Jun. 23, 2016

(51) Int. Cl.
*G06F 9/4401* (2018.01)
*G06F 9/455* (2018.01)

(52) U.S. Cl.
CPC ...... *G06F 9/45558* (2013.01); *G06F 9/45541* (2013.01); *G06F 9/4418* (2013.01); *G06F 2009/45575* (2013.01)

(58) Field of Classification Search
None
See application file for complete search history.

(56) References Cited

U.S. PATENT DOCUMENTS

| 6,088,794 | A * | 7/2000 | Yoon | G06F 1/1616 713/2 |
|---|---|---|---|---|
| 2001/0018717 | A1 * | 8/2001 | Shimotono | G06F 9/441 719/319 |
| 2002/0091872 | A1 * | 7/2002 | Bourke-Dunphy | G06F 8/61 719/316 |
| 2002/0099760 | A1 * | 7/2002 | Liang | G06F 11/3419 718/107 |
| 2009/0007100 | A1 * | 1/2009 | Field | G06F 21/53 718/1 |
| 2010/0122077 | A1 * | 5/2010 | Durham | G06F 1/3203 713/100 |
| 2010/0138641 | A1 * | 6/2010 | Chang | G06F 9/4418 713/2 |
| 2010/0174934 | A1 * | 7/2010 | Zhao | G06F 1/3203 713/324 |
| 2011/0231833 | A1 * | 9/2011 | Narayanan | G06F 8/67 717/171 |

* cited by examiner

*Primary Examiner* — Paul Yen (57) ABSTRACT

Systems and methods for executing multiple operating systems on a computing system without rebooting the computing system are disclosed. Embodiments may include installing a first OS and a second OS on a computing system. Embodiments may further include executing the first OS on hardware resources of the computing system. Some embodiments may also include suspending execution of the first OS, and executing the second OS on the hardware resources while execution of the first OS is suspended.

17 Claims, 7 Drawing Sheets

EXECUTION OF MULTIPLE OPERATING SYSTEMS WITHOUT REBOOTING

FIELD OF DISCLOSURE

The instant disclosure relates generally to computer systems. More specifically, this disclosure relates to execution of multiple operating systems in a computer system without rebooting the computer system.

BACKGROUND

Numerous operating systems (OSs) are available to manage hardware and software resources of a computing system. Each type of OS operates and performs differently and each type of OS is typically optimized for different applications and computing systems. Therefore, many reasons exist for why a user might want to dual boot a computing system. For example, a user might want to try a new version of a favorite OS, but might not be comfortable committing to the new version just yet. A user might also want to dual boot to test a beta version of a new OS without interfering with the operation of a primary OS. Additionally, there might be multiple users of the same computing system, and each user may prefer a different OS. In another situation a user might simply want to have multiple OSs available for different applications.

Traditionally, there are only two options for using multiple OSs on a single computing system. The first option is a dual boot, in which two OSs are installed on a computer and then, when the computer is starting up, a user selects which OS to load. A significant drawback associated with dual booting is that for a user to use the other OS the user must shut down the computer and then restart the computer, that is, "reboot" the computer, to instruct the computer to boot with the second OS.

The second option is virtualization, in which the second OS is virtualized on top of a primary OS. With virtualization, the primary OS acts as a host OS to manage and execute the second OS as a guest OS. Although virtualization relieves the necessity to reboot the computer, because the second OS is merely a virtualization of the OS, hardware resources are actually shared with the primary OS and must be virtualized for use by the second OS. As a result, the second OS executes with significant performance limitations.

Consequently, users are faced with a trade off when contemplating use of multiple OSs on a single computing system. Specifically, users must choose between the inconvenience of rebooting the computer each time they desire to switch to another OS or using an emulated OS with less than optimal overall performance.

SUMMARY

The execution of multiple OSs may be improved with systems and methods that allow for execution of multiple OSs on computing systems without rebooting. According to one embodiment, a method for executing multiple OSs on a computing system without rebooting may include installing a first OS and a second OS on a computing system. The method may also include executing the first OS on hardware resources of the computing system. The method may further include suspending execution of the first OS, and executing the second OS on the hardware resources while execution of the first OS is suspended.

According to another embodiment, a computer program product may include a non transitory computer-readable medium comprising instructions which, when executed by a processor of a computing system, cause the processor to perform the step of installing a first OS and a second OS on a computing system. The medium may also include instructions which cause the processor to perform the step of executing the first OS on hardware resources of the computing system. The medium may further include instructions which cause the processor to perform the steps of suspending execution of the first OS, and executing the second OS on the hardware resources white execution of the first OS is suspended.

According to yet another embodiment, an apparatus may include a memory and a processor coupled to the memory. The processor may be configured to execute the step of installing a first OS and a second OS on a computing system. The processor may also be configured to perform the step of executing the first OS on hardware resources of the computing system. The processor may be further configured to perform the steps of suspending execution of the first OS, and executing the second OS on the hardware resources while execution of the first OS is suspended.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the concepts and specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features that are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the disclosed systems and methods, reference is now made to the following descriptions taken in conjunction with the accompanying drawings.

DETAILED DESCRIPTION

The use of two or more OSs on a single computing system can be improved with a firmware interface configured to interface directly with hardware, allow multiple OSs to be installed on the computing system, and allow a user to switch between execution of a first OS to execution of a second OS without rebooting the computing system. According to an embodiment, such a firmware interface may be a unified extensible firmware interface (UEFI) configured with Secure Partitioning (s-Par®) technology available from Unisys Corporation and embodiments of this disclosure.

Advantages to using multiple OSs on a single computing system without rebooting the computing system, as illustrated in some embodiments of this disclosure, may be numerous. For example, in some embodiments, switching between OSs may be a nearly instantaneous process, which may significantly improve the speed with which OSs are switched. In addition, in some embodiments, because whichever OS is executing on the computing system may directly own the hardware resources, there may be minimal to no performance sacrifice for processors or other hardware components, such as a video card, in using one OS over another. The foregoing example advantages should not be read as limitations to the advantages of embodiments of this disclosure as one of ordinary skill in the art would readily appreciate that many other advantages besides those enumerated here exist which are included in embodiments of this disclosure.

Additionally, the applications for using multiple OSs on a single computing system without rebooting the computing system may be numerous. For example, in some embodiments, users in the gaming industry may experience improved user experiences because gaming users often employ two OSs on their computing systems, one for personal or professional use and another to execute their games. In another application, developers may use embodiments of this disclosure to test or develop an OS without impacting the OS used for personal or business work, in another application, because embodiments of this disclosure may allow for securely dividing a computing system between multiple users, different members of a family or users at a work place may share the same computing system without being able to access another user's files or see another user's OS. The foregoing example applications should not be read as limitations to the applications of embodiments of this disclosure as one of ordinary skill in the art would readily appreciate that many other applications besides those enumerated here exist which are included in embodiments of this disclosure.

Figure 1:
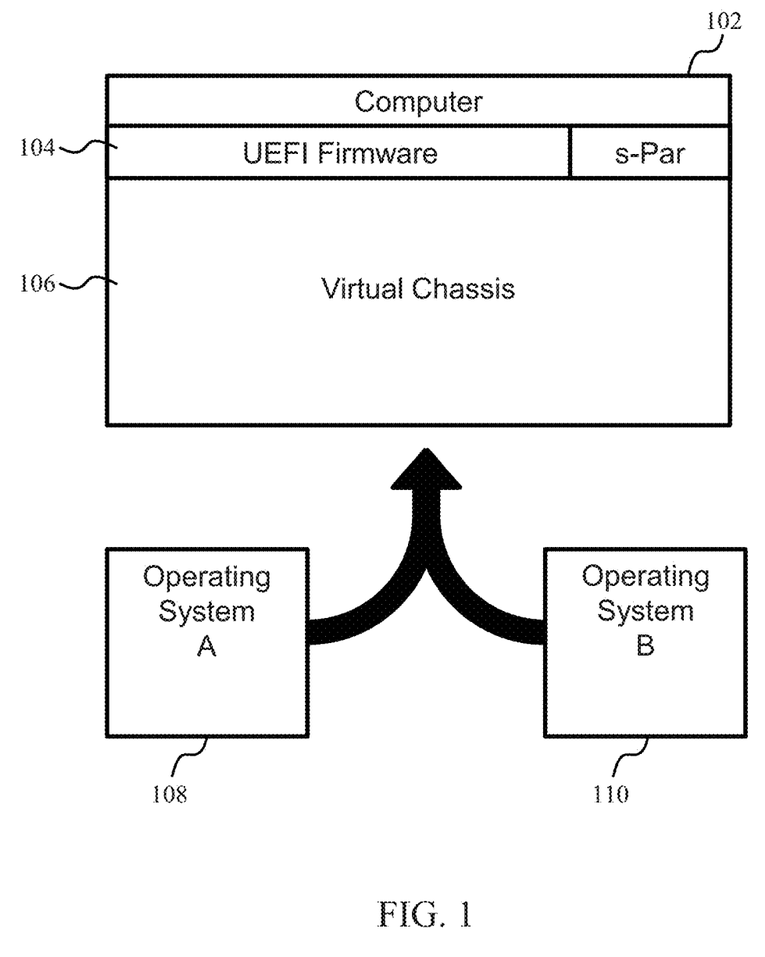
FIG. 1 is a schematic block diagram illustrating a computing system including a firmware interface that manages execution of multiple OSs on the computing system according to one embodiment of the disclosure.

FIG. 1 is a schematic block diagram illustrating a computing system that includes a firmware interface that manages execution of multiple OSs on the computing system according to one embodiment of the disclosure. The computing system 102 may include a firmware interface 104 configured with the s-Par technology and embodiments of this disclosure. The firmware interface 104 may be configured to manage how OSs execute on the virtual chassis 106 of the computing system 102. According to some embodiments, the virtual chassis 106 may correspond to some or all of the hardware resources of the computing system 102 or of a computer network that includes computing system 102. For example, in some embodiments, some or all of the processors in the computing system 102 or in a computer network that includes computing system 102 may be assigned to the virtual chassis 106. According to some embodiments, one or more of the processors of the computing system 102 or of the computer network that includes the computing system 102 may be used as the processing hardware for the firmware interface 104 configured with the s-Par technology and embodiments of this disclosure. Therefore, in some embodiments, the firmware interface 104 may function as a virtual machine, such as a guest machine running virtualization software, managing how the virtual chassis 106 is operated and controlled by controlling which OS gets assigned the right to execute on the virtual chassis 106. In some embodiments, some or all of the peripherals of the computing system 102 or of a computer network that includes computing system 102 may be assigned to the virtual chassis 106. For example, in some embodiments, network interface controllers, such as network cards, of a computing system 102 or of a computer network that includes computing system 102 may be assigned to the virtual chassis 106 and may be completely owned by a currently executing OS. In general, a computing system, such as computing system 102, may correspond to a single computing system of a computer network or may correspond to an entire computer network.

According to the embodiment of FIG. 1, multiple OSs, such as OS A 108 and OS B 110, may be installed on a computing system 102. The firmware interface may be configured to allow a user to select one of the OSs 108 or 110 when the computing system 102 begins its initialization routine. For example, a user may select OS A 108 as the OS to be loaded and executed on the computing system 102. While the computer is on, the user may operate the computing system 102 with OS A 108.

In some embodiments, when a user desires to switch to OS B 110, the user may submit a command or instruction to the firmware interface 104 indicating that the user desires to use OS B 110 to operate the computing system 102. Upon receiving an input indicating that the user desires to use OS B 110 to operate the computing system 102, the firmware interface may initiate an OS suspension routine. For example, the firmware interface 104 may copy the memory in use by OS A 108 and compress the copy of the memory. In some embodiments, the memory in use by OS A 108 may specify the state of OS A 108 immediately before its suspension. The firmware interface may store the compressed memory of OS A 108 in the main memory of the computing system 102 so that it can be accessed at a subsequent time. In other embodiments, the memory associated with OS A 108 may be stored in memory other than the main memory of the computing system 102. For example, in some embodiments, each OS installed on a computing system may be associated with its own memory from the computing system that is not shared with other OSs. In these embodiments in which each OS installed on a computing system may be associated with its own memory, memory of an OS may be stored in the memory associated with the OS prior to suspending the OS. Because each OS may be associated with its own memory, in some embodiments, copying the memory in use by an OS before suspending the OS may not be required. As a result, switching to and from an OS may be performed faster than when copying is required. In general, the memory of an OS may be stored in any storage medium accessible by the firmware interface 106 so long as the memory of the OS may be accessed at a subsequent time.

According to some embodiments, when the memory and state of OS A 108 has been securely stored, firmware interface 104 may suspend any further execution of OS A 108 on the virtual chassis 106. In some embodiments, after OS A 108 has been suspended, firmware interface 104 may configure the virtual chassis 106 to execute OS B 110 so that the user may now operate the computing system 102 with OS B 110. In some embodiments, as long as OS B 110 is executing on the computing system 102, OS A 108 may remain in a suspended state. In other words, in some embodiments, only one OS may be executing on the computing system 102 at any moment in time. According to some embodiments of the disclosure, by allowing only one OS to execute on the computing system 102 at any moment in time, secure isolation between the OSs may be achieved.

As the foregoing has shown, embodiments of this disclosure may allow OS execution on the computing system 102 to transition from execution of a first OS, such as OS A 108, to execution of a second OS, such as OS B 110, without rebooting the computing system 102. In some embodiments, because OS A 108 and OS B 110 may both be installed on the computing system 102, neither OS may need to be a completely virtualized OS to be executed as a guest OS by a host OS. Therefore, in some embodiments, when an OS is executing on the computing system 102, the OS may have complete control of the hardware resources. In addition, because in some embodiments an OS executing on the computing system 102 may be executing directly on the virtual chassis, none of the hardware resources of the virtual chassis may need to be completely virtualized. According to embodiments of the disclosure, by allowing multiple OSs to execute on the computing system 102 without complete virtualization of the OSs or hardware resources, the OSs may execute on the computing system 102 with minimal performance degradation. In other embodiments, some hardware resources may be virtualized and accessed as virtual hardware resources by the executing OS.

In some embodiments, when the user desires to switch back to OS A 108, the user may submit another command or instruction to the firmware interface 104 indicating that the user desires to use OS A 108 to operate the computing system 102. Upon receiving the input indicating that the user desires to use OS A 108 to operate the computing system 102, the firmware interface may initiate the suspension routine for OS B 110. For example, the firmware interface 104 may copy the memory in use by OS B 110 and compress the memory. In some embodiments, the memory in use by the OS B 110 may specify the state of OS B 110 immediately before its suspension. The firmware interface may store the compressed memory of OS B 110 in the main memory of the computing system 102 so that it can be accessed at a subsequent time. However, in other embodiments, the compressed memory associated with OS B 110 may be stored in memory other than the main memory of the computing system 102. In general, the compressed memory of OS B 110 may be stored in any storage medium accessible by the firmware interface 106 so long as the compressed memory may be accessed at a subsequent time.

According to some embodiments, when the memory and state of OS B 110 has been securely stored, firmware interface 104 may suspend any further execution of OS B 110 on the virtual chassis 106. In some embodiments, after OS B 110 has been suspended, the compressed memory of OS A 108 may be reloaded from the location in memory where the compressed memory of OS A 108 was stored prior to suspending execution of OS A 108 so that OS A 108 may return to its state of execution prior to it being suspended. After the memory of OS A 108 has been reloaded, the firmware interface 104 may configure the virtual chassis 106 to return to executing OS A 108 so that the user may now operate the computing system 102 with OS A 108. In some embodiments, execution of OS A 108 may begin from the state where it left off when it was suspended. In some embodiments, as long as OS A 108 is executing on the computing system 102, OS B 110 may remain in a suspended state.

Figure 2:
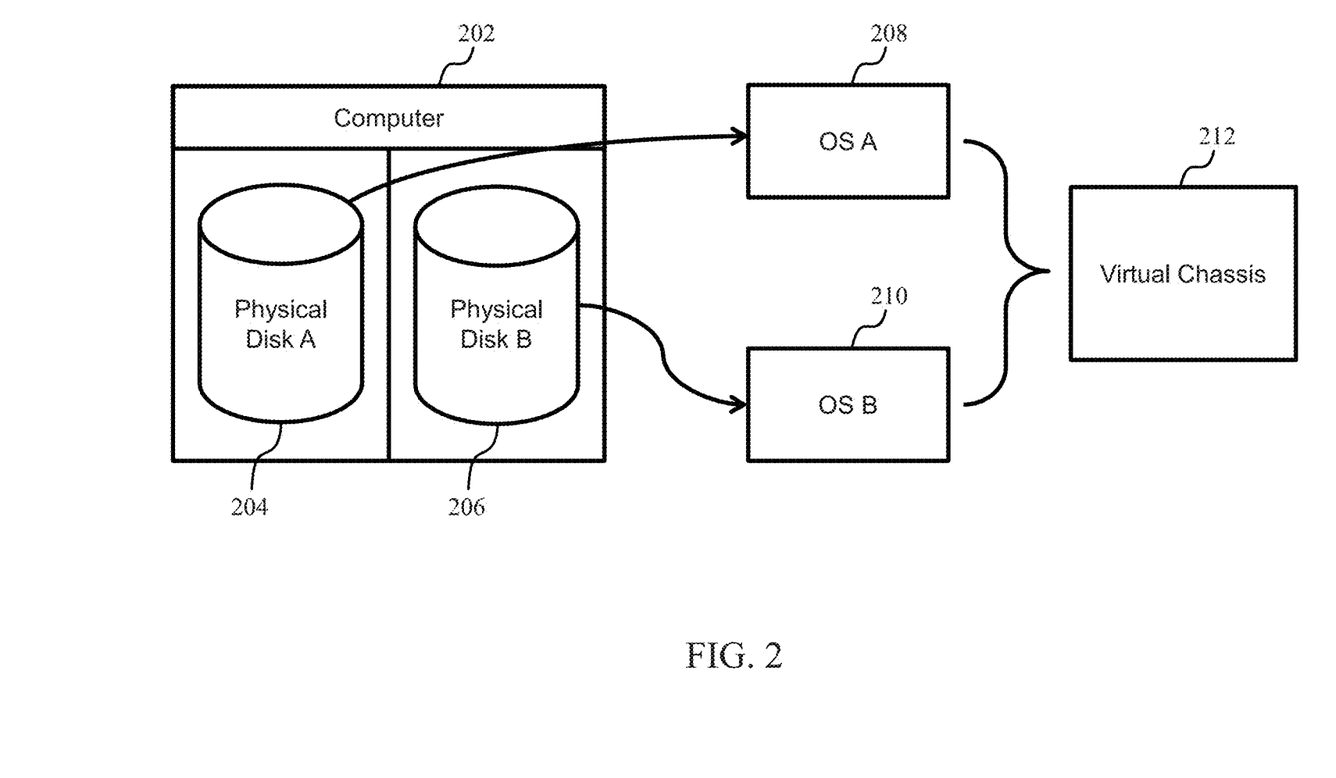
FIG. 2 is a schematic block diagram illustrating separate disks being assigned to different OSs according to one embodiment of the disclosure.

In some embodiments, because more than one OS may be installed in a computing system, the disk or disks of a computing system may be divided between the OSs. A number of options may be available for assigning disks to OSs. For example, FIG. 2 is a schematic block diagram illustrating separate disks being assigned to different OSs according to one embodiment of the disclosure. As illustrated in FIG. 2, the computing system 202 may include multiple disks, such as physical disk A 204 and physical disk B 206. In addition, two OSs, OS A 208 and OS B 210, may be available for installation on computing system 202, Because the computing system includes two disks, physical disk A 204 and physical disk B 206, each OS may be assigned its own disk. In particular, OS A 208 may be assigned physical disk A 204 and OS B 210 may be assigned physical disk B 206. In embodiments similar to the embodiment illustrated in FIG. 2 in which the computing system includes multiple physical disks assigned to different OSs, the physical disk from which an OS may be assigned to the virtual chassis 212 of a computing system may be based upon the OS desired to be executed. In other words, when a user assigns an OS the right to execute on the virtual chassis 212, the OS may be retrieved from its associated physical disk.

In other embodiments, computing system 202 may include more than two disks. In general, the principles illustrated in FIG. 2 for assigning two disks to two different OSs may be expanded to be applicable to the assignment of any number of disks to any number of different OSs in a computing system. Accordingly, one of skill in the art would readily recognize that an assignment of more than two physical disks to more than two OSs is an embodiment of this disclosure and is therefore not a departure from this disclosure.

Figure 3:
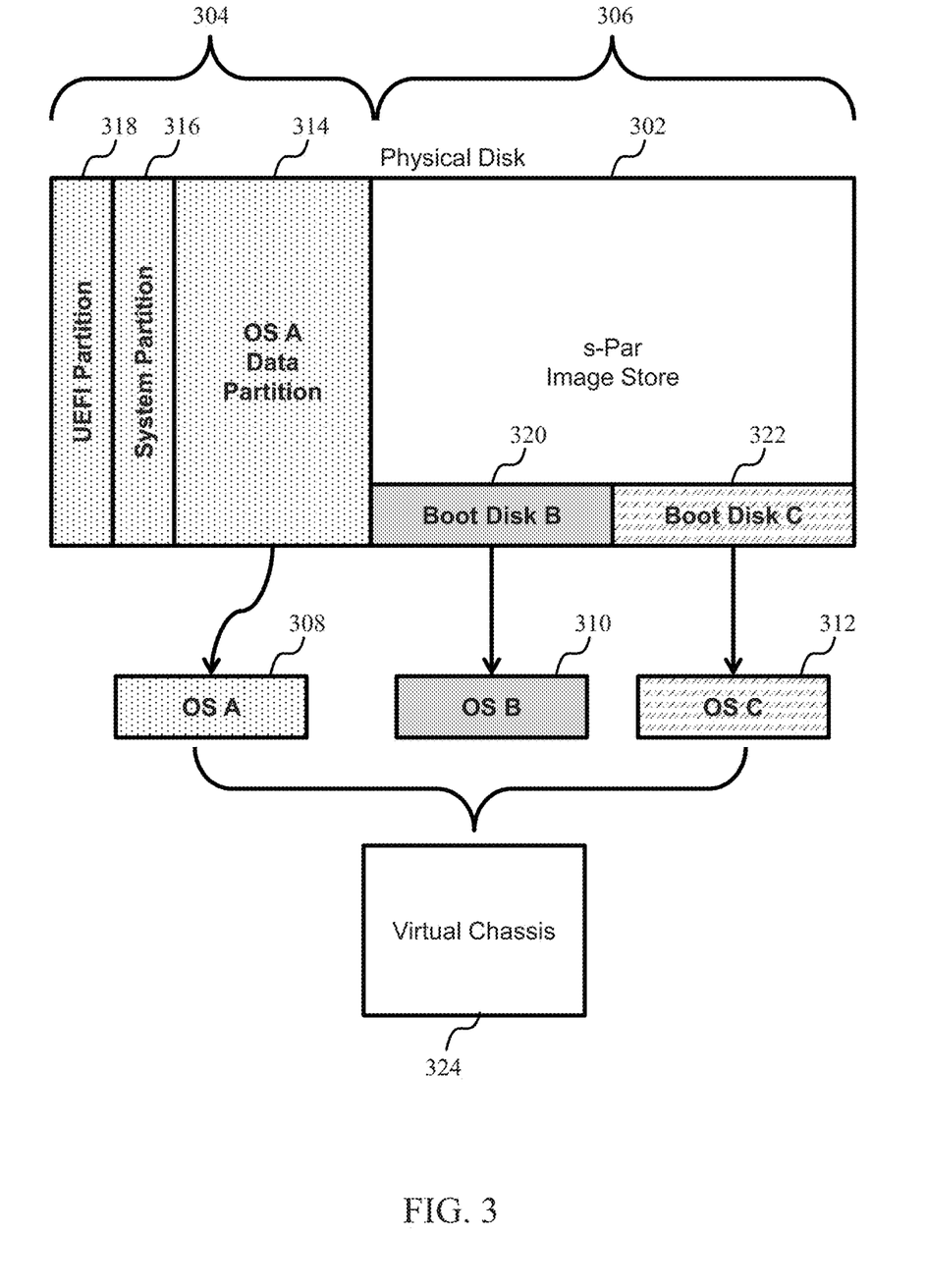
FIG. 3 is a schematic block diagram illustrating assignment of different OSs to a single hybrid disk including a direct disk and an image store according to one embodiment of the disclosure.

FIG. 3 is a schematic block diagram illustrating assignment of different OSs to a single hybrid disk including a direct disk and a disk image store according to one embodiment of the disclosure. As is illustrated in the embodiment of FIG. 3, there may be one physical disk 302 for three OSs, OS A 308, OS B 310, and OS C 312. In the embodiment of FIG. 3, the physical disk 302 may be partitioned into two partitions, partition 304 and partition 306. In some embodiments, OS A 308 may have been the only OS originally assigned to physical disk 302 before physical disk 302 was partitioned. Therefore, in the embodiment of FIG. 3, a partition of physical disk 302, such as partition 304, may already include data associated with OS A 308, such as OS A Data Partition 314. Consequently, partition 304 may be assigned to OS A 308. In some embodiments, any other information originally on physical disk 302 before physical disk 302 was partitioned may be stored in partition 304. For example, system information may be located in system partition 316 of partition 304, and UEFI data may be located in UEFI partition 318 of partition 304.

In some embodiments, partition 306 may be used as a disk image by a firmware interface of this disclosure which may assign sub-partitions of partition 306 (disk image) to additional OSs. For example, sub-partition B 320 may be a sub-partition of partition 306 assigned to OS B 310, and sub-partition C 322 may be a sub-partition of partition 306 assigned to OS C 312.

When partitions have been assigned to OSs, a firmware interface may use the assignments to switch between OS assignments to the virtual chassis 324. For example, in one embodiment, a firmware interface may assign OS A 308 to the virtual chassis 324 from OS A Data Partition 314. In another embodiment, a firmware interface may assign OS B 310 to the virtual chassis 324 from sub-partition B 320. According to another embodiment, a firmware interface may assign OS C 312 to the virtual chassis 324 from sub-partition C 322.

In some embodiments, assignment of different OSs to a single hybrid disk including a direct disk and a disk image store, as illustrated in FIG. 3, may allow a user to install and use additional OSs on a physical disk on which an OS is already installed without requiring that the physical disk be erased. This presents another advantage to embodiments of this disclosure in which a user may install and use additional OSs on a current computing system with minimal to no disturbance to current configurations of the computing system and without erasing a physical disk of the computing system.

In some embodiments, the physical disk 302 illustrated in FIG. 3 may correspond to an entire physical disk available in a computing system. In other embodiments, the physical disk 302 illustrated FIG. 3 may correspond to only a portion of a physical disk, such as an existing partition of a physical disk.

Figure 4:
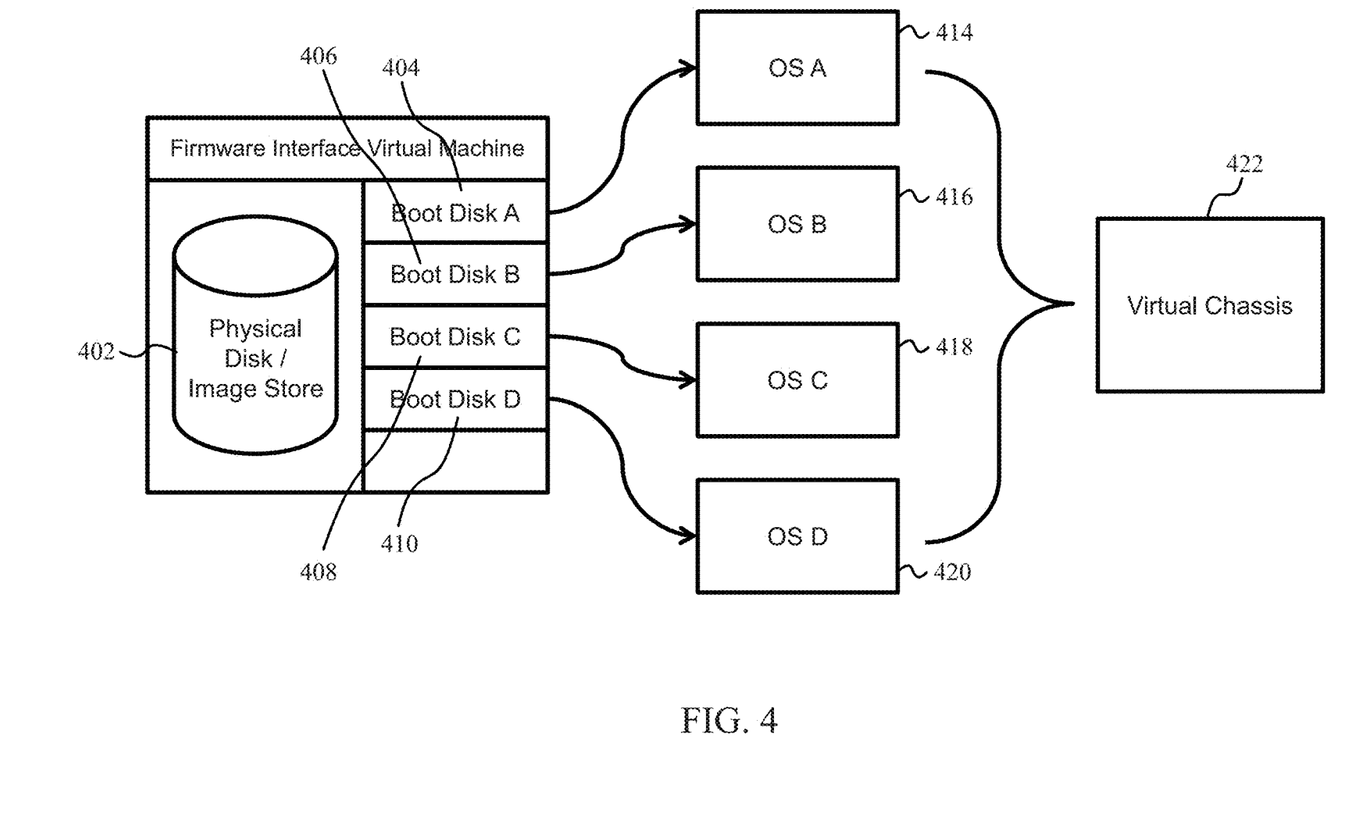
FIG. 4 is a schematic block diagram illustrating assignment of an entire physical disk to a firmware interface virtual machine which may assign virtual disks to OSs according to one embodiment of the disclosure.

FIG. 4 is a schematic block diagram illustrating assignment of an entire physical disk to a firmware interface virtual machine which may assign virtual disks to OSs according to one embodiment of the disclosure. Unlike the embodiment in FIG. 3, in which only partition 306 of the physical disk 302 was dedicated for use as a disk image while partition 304 included original data not erased from the physical disk 302, in the embodiment of FIG. 4, the entire physical disk 402 may be erased and dedicated for use as a disk image by the firmware interface virtual machine. Therefore, similar to the embodiment of FIG. 3, a firmware interface may assign different partitions of the physical disk to different OSs available for use in a computing system. For example, partition A 404, partition B 406, partition C 408, and partition D 410 may be disk image partitions of the physical disk 402 assigned to OS A 414, OS B 416, OS C 418, and OS D 420, respectively.

When partitions have been assigned to OSs, a firmware interface may use the assignments to switch between OS assignments to the virtual chassis 422. For example, in one embodiment, a firmware interface may assign OS A 414 to the virtual chassis 422 from partition A 404. In another embodiment, a firmware interface may assign OS B 416 to the virtual chassis 422 from partition B 406. According to another embodiment, a firmware interface may assign OS C 418 to the virtual chassis 422 from partition C 408. In another embodiment, a firmware interface may assign OS D 420 to the virtual chassis 422 from partition D 410.

In view of exemplary systems shown and described herein, methodologies that may be implemented in accordance with the disclosed subject matter will be better appreciated with reference to various functional block diagrams. While, for purposes of simplicity of explanation, methodologies are shown and described as a series of acts/blocks, it is to be understood and appreciated that the claimed subject matter is not limited by the number or order of blocks, as some blocks may occur in different orders and/or at substantially the same time with other blocks from what is depicted and described herein. Moreover, not all illustrated blocks may be required to implement methodologies described herein. It is to be appreciated that functionality associated with blocks may be implemented by software, hardware, a combination thereof or any other suitable means (e.g. device, system, process, or component). Additionally, it should be further appreciated that methodologies disclosed throughout this specification are capable of being stored on an article of manufacture to facilitate transporting and transferring such methodologies to various devices. Those skilled in the art will understand and appreciate that a methodology could alternatively be represented as a series of interrelated states or events, such as in a state diagram.

Figure 5:
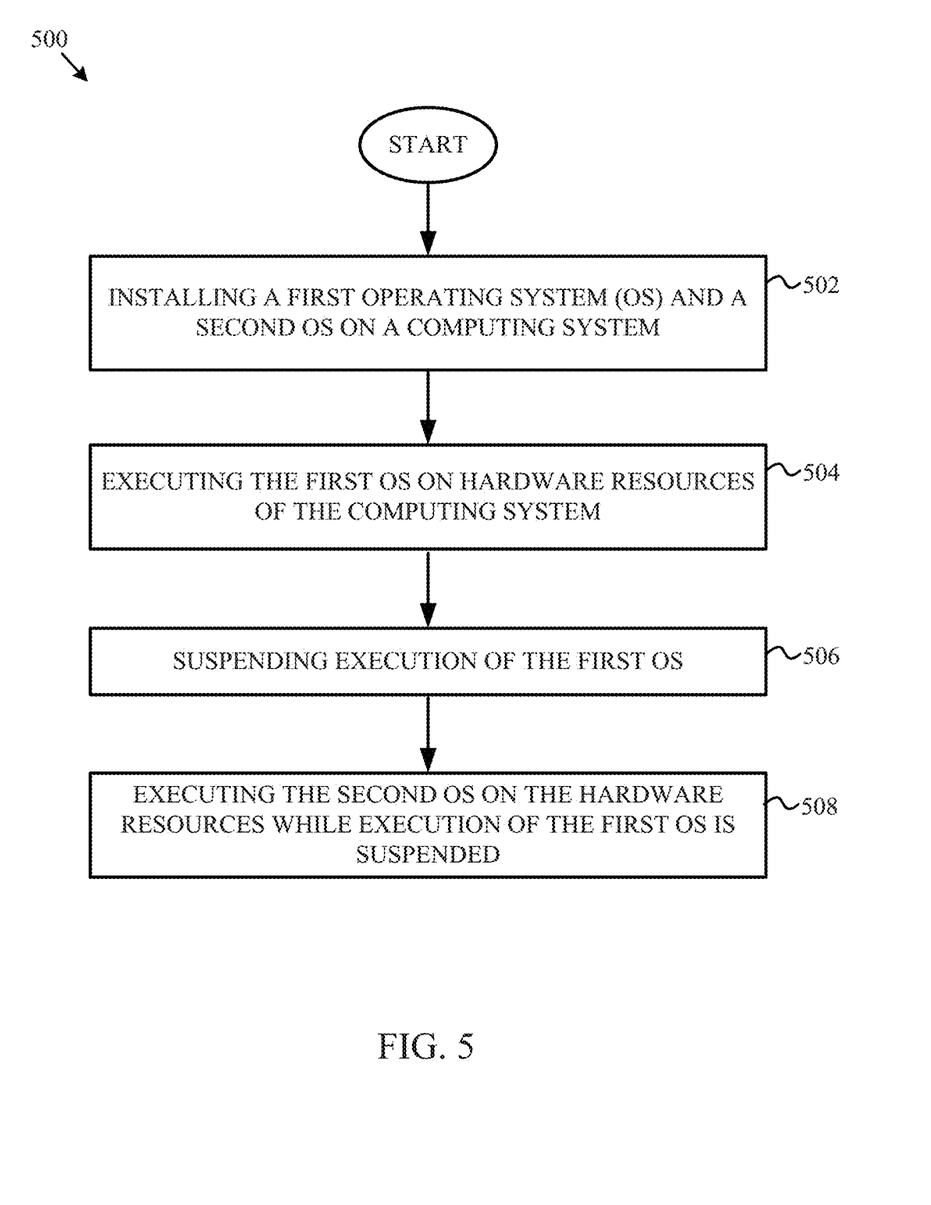
FIG. 5 is a flow chart illustrating a method for executing multiple operating systems on a computing system without rebooting according to one embodiment of the disclosure.

FIG. 5 is a flow chart illustrating a method for executing multiple operating systems on a computing system without rebooting according to one embodiment of the disclosure. It is noted that embodiments of method 500 may be implemented with the systems described with respect to FIGS. 1-4 and 6-7. For example, in some embodiments, a processor disclosed in method 500 may correspond to a processor operating under the instruction of a firmware interface disclosed in this disclosure. Specifically, method 500 includes, at block 502, installing, by a processor, a first OS and a second OS on a computing system. In some embodiments, neither the first OS nor the second OS may be a completely virtualized OS. At block 504, method 500 includes executing, by the processor, the first OS on hardware resources of the computing system. In some embodiment, the hardware resources may correspond to a virtual chassis, At block 506, method 500 includes suspending, by the processor, execution of the first OS. For example, when a user desires to switch to the second OS, the suspension routine, such as the suspension routine performed at block 506, may he initiated to suspend execution of the first OS. In some embodiments, prior to suspending execution of the first OS, memory used by the first OS may be copied, compressed, and stored in main memory. In some embodiments, the state of the first OS may also be stored before suspending execution of the first OS.

Method 500 may also include, at block 508, executing, by the processor, the second OS on the hardware resources while execution of the first OS is suspended. In some embodiments, execution of the second OS on the hardware resources may commence without restarting the computing system. For example, method 500 may illustrate a method by which, as illustrated in the embodiment FIG. 1, OS execution on a computing system may transition from execution of the first OS, such as OS A 108, to execution of the second OS, such as OS B 110, without rebooting the computing system.

In some embodiments, after execution of the second OS, such as at block 508, a method may also include suspending execution of the second OS. For example, when a user desires to switch back to the first OS, a suspension routine may be initiated to suspend execution of the second OS. Because the first OS may have merely been suspended at block 506, when a user returns to using the first OS, OS execution may return to the first OS in the same manner that OS execution transitioned to the second OS, that is, without rebooting. Therefore, in some embodiments, a method may also include continuing execution of the first OS on the hardware resources while execution of the second OS is suspended.

The schematic flow chart diagram of FIG. 5 is generally set forth as a logical flow chart diagram. As such, the depicted order and labeled steps are indicative of aspects of the disclosed method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagram, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 6:
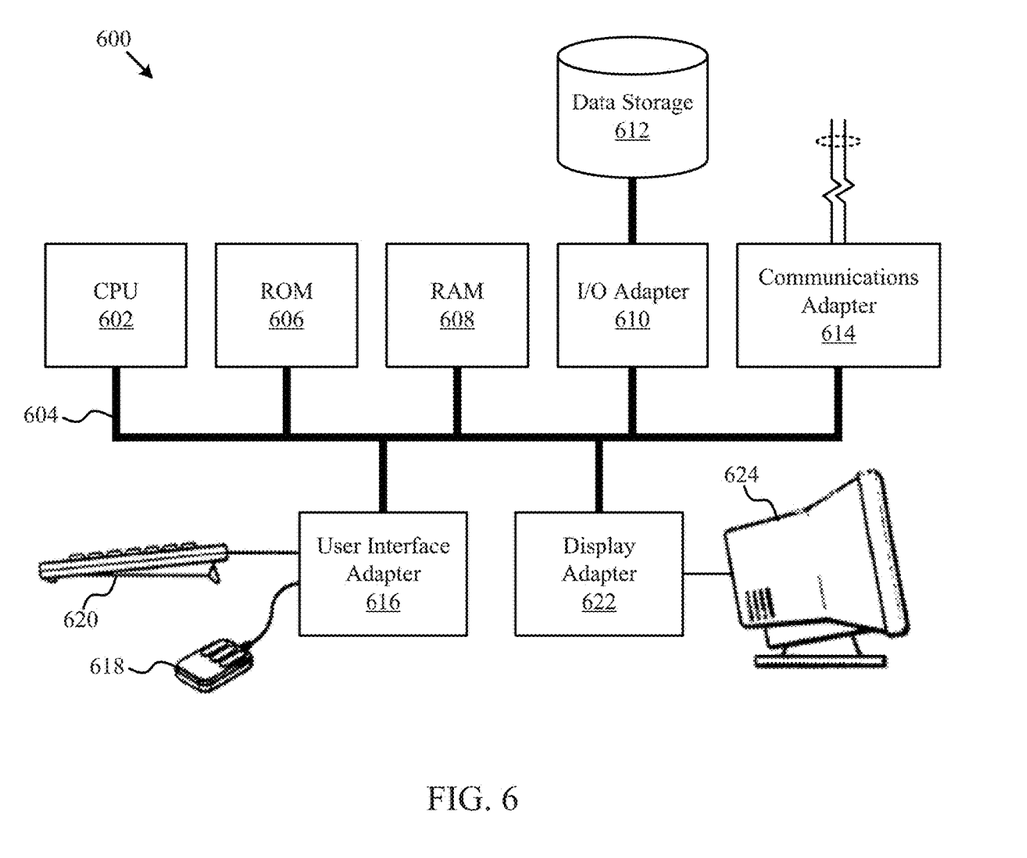
FIG. 6 is a block diagram illustrating a computer system according to one embodiment of the disclosure.

FIG. 6 illustrates a computer system 600 adapted according to certain embodiments of a server and/or a user interface device. The central processing unit ("CPU") 602 is coupled to the system bus 604. The CPU 602 may be a general purpose CPU or microprocessor, graphics processing unit ("GPU"), and/or microcontroller. The present embodiments are not restricted by the architecture of the CPU 602 so long as the CPU 602, whether directly or indirectly, supports the operations as described herein. The CPU 602 may execute the various logical instructions according to the present embodiments.

The computer system 600 may also include random access memory (RAM) 608, which may be synchronous RAM (SRAM), dynamic RAM (DRAM), synchronous dynamic RAM (SDRAM), or the like. The computer system 600 may utilize RAM 608 to store the various data structures used by a software application. The computer system 600 may also include read only memory (ROM) 606 which may be PROM, EPROM, EEPROM, optical storage, or the like. The ROM may store configuration information for booting the computer system 600. The RAM 608 and the ROM 606 hold user and system data, and both the RAM 608 and the ROM 606 may be randomly accessed.

The computer system 600 may also include an input/output (I/O) adapter 610, a communications adapter 614, a user interface adapter 616, and a display adapter 622. The I/O adapter 610 and/or the user interface adapter 616 may, in certain embodiments, enable a user to interact with the computer system 600. In a further embodiment, the display adapter 622 may display a graphical user interface (GUI) associated with a software or web-based application on a display device 624, such as a monitor or touch screen.

The I/O adapter 610 may couple one or more storage devices 612, such as one or more of a hard drive, a solid state storage device, a flash drive, a compact disc (CD) drive, a floppy disk drive, and a tape drive, to the computer system 600. According to one embodiment, the data storage 612 may be a separate server coupled to the computer system 600 through a network connection to the I/O adapter 610. The communications adapter 614 may be adapted to couple the computer system 600 to a network, which may be one or more of a LAN, WAN, and/or the Internet. The user interface adapter 616 couples user input devices, such as a keyboard 620, a pointing device 618, and/or a touch screen (not shown) to the computer system 600. The display adapter 622 may be driven by the CPU 602 to control the display on the display device 624. Any of the devices 602-622 may be physical and/or logical.

The applications of the present disclosure are not limited to the architecture of computer system 600. Rather the computer system 600 is provided as an example of one type of computing device that may be adapted to perform the functions of a server and/or the user interface device 610. For example, any suitable processor-based device may be utilized including, without limitation, personal data assistants (PDAs), tablet computers, smartphones, computer game consoles, and multi-processor servers. Moreover, the systems and methods of the present disclosure may be implemented on application specific integrated circuits (ASIC), very large scale integrated (VLSI) circuits, or other circuitry. In fact, persons of ordinary skill in the art may utilize any number of suitable structures capable of executing logical operations according to the described embodiments. For example, in some embodiments, aspects of the computer system 600 may be virtualized for access by multiple users and/or applications.

Figure 7:
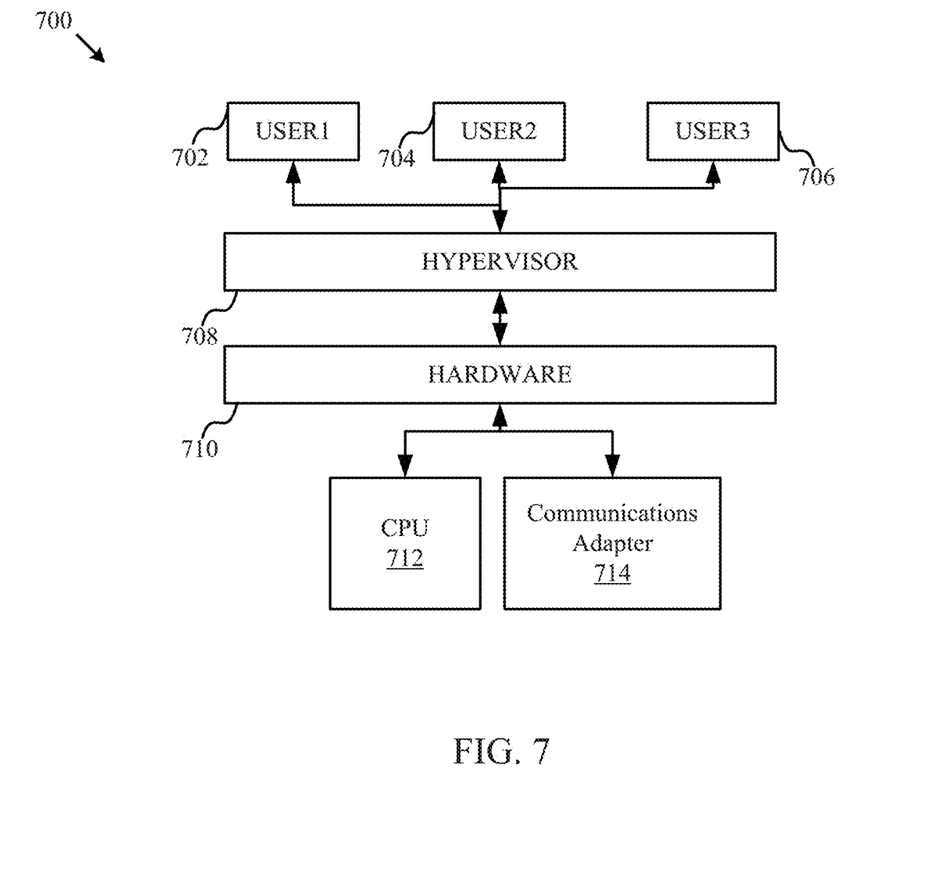
FIG. 7 is a block diagram illustrating a hypervisor acting as an interface between users and hardware according to one embodiment of the disclosure.

In some embodiments, hardware in a computer system may be interfaced through a hypervisor. For example, FIG. 7 is a block diagram illustrating a hypervisor acting as an interface between users and hardware according to one embodiment of the disclosure. Users 702, 704, 706 may access the hardware 710 through a hypervisor 708, which may, in some embodiments, correspond to a firmware interface disclosed in this disclosure. In some embodiments, the hypervisor 708 may be integrated with the hardware 710. The hypervisor 708 may provide access to the hardware 710, including the CPU 712 and the communications adaptor 714.

If implemented in firmware and/or software, the functions described above may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc includes compact discs (CD), laser discs, optical discs, digital versatile discs (DVD), floppy disks and blu-ray discs. Generally, disks reproduce data magnetically, and discs reproduce data optically. Combinations of the above should also be included within the scope of computer-readable media.

In addition to storage on computer-readable medium, instructions and/or data may be provided as signals on transmission media included in a communication apparatus. For example, a communication apparatus may include a transceiver having signals indicative of instructions and data. The instructions and data may be configured to cause one or more processors to implement the functions outlined in the claims.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the present invention, disclosure, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A method for executing multiple operating systems on a computer system in isolation from one another, the method comprising:
    storing, by hardware resources of the computer system an installed first operating system (OS) and an installed second OS wherein the installed first OS is associated with a first memory portion of the hardware resources and the installed second OS is associated with a second memory portion of the hardware resources different from the first memory portion, and the first and second memory portions are not shared;
    executing, by the hardware resources, a firmware interface that is distinct from the first OS and the second OS and operates at a lower layer of the computer system than the first OS and the second OS to effect switching between the first OS and the second OS, the firmware interface to receive a command to switch operating systems and, in response to the command, to selectively vary execution of the first OS and the second OS, wherein selectively varying of the execution includes suspension of the first OS, the suspension being performed independently of any operation of the first OS and the second OS;
    executing the first OS, by the hardware resources, under the control of the firmware interface, such that the first OS is given direct control of the hardware resources;
    suspending, by the hardware resources, under the control of the firmware interface, execution of the first OS, in response to the command; and
    executing the second OS, by the hardware resources, under the control of the firmware interface, such that the second OS is given direct control of the hardware resources while execution of the first OS is suspended, wherein the suspending of the first OS and the executing of the second OS are done without rebooting to load the second OS.

2. The method of claim 1, wherein neither the first OS nor the second OS is a completely virtualized OS.

3. The method of claim 1, further comprising:
    by the hardware resources, under the control of the firmware interface:
        receiving a second command to switch operating systems; and
        in response to the second command:
            suspending execution of the second OS without copying the second memory portion; and
            resuming execution of the first OS on the hardware resources while execution of the second OS is suspended.

4. The method of claim 1, wherein, in response to the command, memory used by the first OS is compressed by the hardware resources under the control of the firmware interface.

5. The method of claim 1, further comprising storing the state of the first OS before suspending execution of the first OS by the hardware resources under the control of the firmware interface.

6. The method of claim 1, wherein the hardware resources comprise a virtual chassis.

7. At least one non-transitory machine-readable medium comprising instructions that, when executed from firmware on hardware resources of a computer system, implement a firmware interface that is distinct from any operating system (OS) of the computer system and is operative at a lower layer of the computer system than any such OS, wherein the firmware interface causes the hardware resources to:
    boot an installed first OS and an installed second OS wherein the installed first OS is associated with a first memory portion of the hardware resources and the installed second OS is associated with a second memory portion of the hardware resources different from the first memory portion, and the first and second memory portions are not shared;
    effect switching between the first OS and the second OS, wherein the firmware interface is operative to receive a command to switch operating systems and, in response to the command, to selectively vary execution of the first OS and the second OS, wherein selective variation of the execution includes suspension of the first OS, the suspension being performed independently of any operation of the first OS and the second OS;
    independently of the first OS and the second OS, control execution of first OS such that the first OS is given direct control of the hardware resources;
    independently of the first OS and the second OS, suspend execution of the first OS in response to the command; and
    independently of the first OS and the second OS, execute the second OS such that the second OS is given direct control of the hardware resources while execution of the first OS is suspended, wherein the suspension of the first OS and the execution of the second OS are done without rebooting to load the second OS.

8. The at least one non-transitory machine-readable medium of claim 7, wherein neither the first OS nor the second OS is a completely virtualized OS.

9. The at least one non-transitory machine-readable medium of claim 7, further comprising instructions that implement the firmware interface that causes the hardware resources to:
    receive a second command to switch operating systems; and
    in response to the second command:
        independently of the first OS and the second OS, suspend execution of the second OS without copying the second memory portion; and
        independently of the first OS and the second OS, resume execution of the first OS on the hardware resources while execution of the second OS is suspended.

10. The at least one non-transitory machine-readable medium of claim 7, further comprising instructions that implement the firmware interface that causes the hardware resources to:
    independently of the first OS and the second OS, in response to the command, compress memory used by the first OS.

11. The at least one non-transitory machine-readable medium of claim 7, further comprising instructions that implement the firmware interface that causes the hardware resources to:
   independently of the first OS and the second OS, in response to the command, store a state of the first OS before suspending execution of the first OS.

12. Apparatus for executing multiple operating systems on a computer system in isolation from one another, the apparatus comprising:
   hardware resources, including at least one processor, memory, a firmware portion, and input/output facilities;
   wherein the hardware resources store an installed first operating system (OS) and an installed second OS, wherein the installed first OS is associated with a first memory portion of the memory of the hardware resources and the installed second OS is associated with a second memory portion of the memory of the hardware resources different from the first memory portion, and the first and second memory portions are not shared;
   wherein the firmware portion includes instructions that, when executed by the hardware resources, cause the hardware resources to implement a firmware interface that is distinct from the first OS and the second OS and is operative at a lower layer of the computer system than the first OS and the second OS to effect switching between the first OS and the second OS, the firmware interface to receive a command to switch operating systems and, in response to the command, to selectively vary execution of the first OS and the second OS, wherein selective variation of the execution includes suspension of the first OS, the suspension being performed independently of any operation of the first OS and the second OS;
   wherein the firmware interface is to:
      initiate execution of the first OS, such that the first OS is given direct control of the hardware resources;
      suspend execution of the first OS in response to the command; and
      execute the second OS, such that the second OS is given direct control of the hardware resources while execution of the first OS is suspended, wherein the suspension of the first OS and the executing of the second OS are done without rebooting to load the second OS.

13. The apparatus of claim 12, wherein neither the first OS nor the second OS is a completely virtualized OS.

14. The apparatus of claim 12, wherein the firmware interface is to:
   receive a second command to switch operating systems; and
   in response to the second command:
      suspend execution of the second OS without copying the second memory portion; and
      resume execution of the first OS on the hardware resources while execution of the second OS is suspended.

15. The apparatus of claim 12, wherein, in response to the command, memory used by the first OS is compressed by the hardware resources under the control of the firmware interface.

16. The apparatus of claim 12, wherein the firmware interface is to:
   store the state of the first OS before suspending execution of the first OS.

17. The apparatus of claim 12, wherein the hardware resources comprise a virtual chassis.

* * * * *